United States Patent [19]

Nalley

[11] 4,283,855
[45] Aug. 18, 1981

[54] SABRE SAW WITH ROTATABLE SAW BAR

[75] Inventor: David J. Nalley, Liberty, S.C.

[73] Assignee: The Singer Company, Stamford, Conn.

[21] Appl. No.: 137,928

[22] Filed: Apr. 7, 1980

[51] Int. Cl.³ .................... B27B 11/00; B27B 19/09
[52] U.S. Cl. .................................................. 30/394
[58] Field of Search ........................ 30/392, 393, 394

[56] References Cited

U.S. PATENT DOCUMENTS

| | | | |
|---|---|---|---|
| 3,494,390 | 2/1970 | Dudek | 30/394 |
| 3,494,391 | 2/1970 | Mango | 30/394 |
| 3,547,166 | 12/1970 | Dudek | 30/392 X |
| 3,665,983 | 5/1972 | Wagner | 30/394 |
| 3,729,822 | 5/1973 | Batson | 30/394 |
| 4,055,893 | 11/1977 | Saxe | 30/392 |

Primary Examiner—Jimmy C. Peters
Attorney, Agent, or Firm—Elliot A. Lackenbach; Edward L. Bell; Robert E. Smith

[57] ABSTRACT

A sabre saw is provided with a generally tubular saw bar journalled for linear movement in a journal bushing secured in the top portion of the housing and rotatable therein with means provided so that they rotate together. The journal bushing is provided with a generally annular collar in turn provided with a plurality of generally radial notches and a cantilever leaf spring is mounted to the housing with its distal end adjacent the collar and shaped for selective engagement within the notches. A slide trigger is slidably carried by the housing at a top portion thereof convenient to the operator's thumb control which when slid towards the saw bar depresses the cantilevered leaf spring against the collar and into a selective one of the notches when they are aligned for locking the saw bar against rotation. Rearward movement of the trigger slide is effective to release the cantilevered leaf spring wherein it will pop up out of the notch and permit free rotation of the saw bar. Spring biased latching means are also provided for selectively latching the trigger slide in its forward position.

3 Claims, 5 Drawing Figures

SABRE SAW WITH ROTATABLE SAW BAR

DESCRIPTION

Field of the Invention

This application relates to sabre saws having a rotatable saw bar and, more particularly, to selective locking and unlocking means therefore.

BACKGROUND OF THE INVENTION

A number of prior patents have disclosed sabre saws having rotatable saw bars and various means for controlling the rotation thereof. For example, Bechtold, U.S. Pat. No. 2,547,922 shows the rotation of a saw bar of a sabre saw about its own axis together with a frictional locking means to hold the saw in position for straight cutting. More recently, U.S. Pat. No. 3,494,490 and 3,494,391, each entitled "Sabre Saw With 360° Swivel Saw Bar" have used a pin locking and a key locking means, respectively, in place of the frictional locking means. U.S. Pat. No. 3,665,983 entitled "Sabre Saws With Angularly Adjustable Swivel Saw Bar" uses a cam actuated spring-biased locking pin, positionable between a locked and an unlocked position carried by the control knob and which, in the locked position, will engage one of the plurality of holes set in the housing a predetermined angular positions corresponding to the desired angular position of the cutting edge of the saw blade.

In each of the last mentioned three patents, the locking and unlocking mechanism is incorporated in the control knob, making the control knob an expensive and complicated assembly. Moreover, necessity to provide room within the control knob for the operating mechanism adds to the overall height of the sabre saw. In Bechtold, as heretofore pointed out, the locking arrangement is not positive but is frictional and could become dislodged because of vibration of the saw in use enabling the saw blade to twist when it is desired to retain it in a set position.

In U.S. Pat. No. 3,729,822 entitled "Sabre Saws With Lockable Swivel Saw Bars" a locking pin slidable on the housing and activated by a trigger slide selectively locks the swivel saw bar against rotation and a spring detent retains the trigger slide and associated pin in either the locked or unlocked position, which at times has been found too difficult to operate and which requires that the saw bar be prealigned before the trigger slide can be moved to the locked position.

OBJECTS OF THE INVENTION

Bearing in mind the foregoing, it is a primary object of the present invention to provide sabre saws having rotatable saw bars and novel and improved low cost, easily operated and reliable positive acting means for selectively locking the saw bar against rotation and unlocking it for swivel action.

Another primary object of the present invention, in addition to the foregoing object, is the provision of such locking and unlocking means housed within the saw housing and readily actuable by the operator.

Another primary object of the present invention, in addition to each of the foregoing objects, is the provision of such locking and unlocking means that is economic to manufacture, durable and reliable in use, and esthetically appealing.

Yet still another primary object of the present invention, in addition to each of the foregoing objects, is to provide an automatically effective operative means for selectively and manually controlling the angular position of the saw bar of a sabre saw about its own axis at all times during the cutting operaton, without adding substantially to the production cost of the tool.

Another and yet still further primary object of the present invention, in addition to each of the foregoing objects, is the provision of an automatically effective operative means for selectively and manually controlling the angular position of the saw bar of a sabre saw about its own axis at all times during the cutting operation which uses a spring biased locking means, positionable between a locked and an unlocked position, and which may be actuated without requiring prealignment of the saw bar in the selected angular position.

Yet another and still further primary object of the present invention, in addition to each of the foregoing objects, is the provision in a sabre saw having a swivel saw bar of an improved locking and unlocking means for such saw bar which has the actuator button mounted in the handle for ease of operation which is easily slid forward to a locked position and rearwardly to an unlocked position but which yet positively retains the saw bar in its locked position and is substantially resistant to inadvertent or accidental unlocking thereof.

The invention resides in the combination, construction, arrangement and disposition of the various component parts and elements incorporated in improved sabre saws and swivel saw bar locking and unlocking means therefore in accordance with the principles of this invention. The present invention will be better understood and objects and important features other than those specifically enumerated above will become apparent when consideration is given to the following details and description which, when taken in conjunction with the annexed drawing described, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved, especially as they fall within the scope and spirit of the subjoined claims.

SUMMARY OF THE INVENTION

In accordance with the present invention, a sabre saw is provided with a generally tubular saw bar journalled for linear movement in a sleeve bearing secured in the bottom portion of the saw housing and a journal bushing secured in the top portion of the housing and rotatable therein. Means are provided between the top of the saw bar and the journal bushing so that they rotate together. The journal bushing is provided with a generally annular collar in turn provided with a plurality of generally radial notches for cooperation with locking means to selectively lock the journal bushing and saw bar at desired rotational positions. A cantilever leaf spring is mounted to the housing with its distle end adjacent the collar and shaped for selective engagement within the notches. A slide trigger is slidably carried by the housing at a top portion thereof convenient to the operator's thumb control which, when slid towards the saw bar depresses the cantilevered leaf spring against the collar and into a selective one of the notches when they are aligned for locking the saw bar against rotation. Rearward movement of the trigger slide is effective to release the cantilever leaf spring wherein it will pop up out of the notch and permit free rotation of the saw bar. Spring biased latching means are also provided for selectively latching the trigger slide in its forward position wherein the cantilever leaf spring is pressed by the slide toward the locked position.

DESCRIPTION OF THE DRAWING

While the specification concludes with claims particularly pointing out and distinctly claiming the subject matter which is regarded as forming the present invention, it is believed the invention will be better understood from the following detailed description when taken in conjunction with the annexed drawing which discloses, illustrates and shows a preferred embodiment or modification of the present invention and what is presently considered and believed to be the best mode of practicing the principles thereof and wherein:

DETAILED DESCRIPTION OF THE INVENTION

Figure 1:
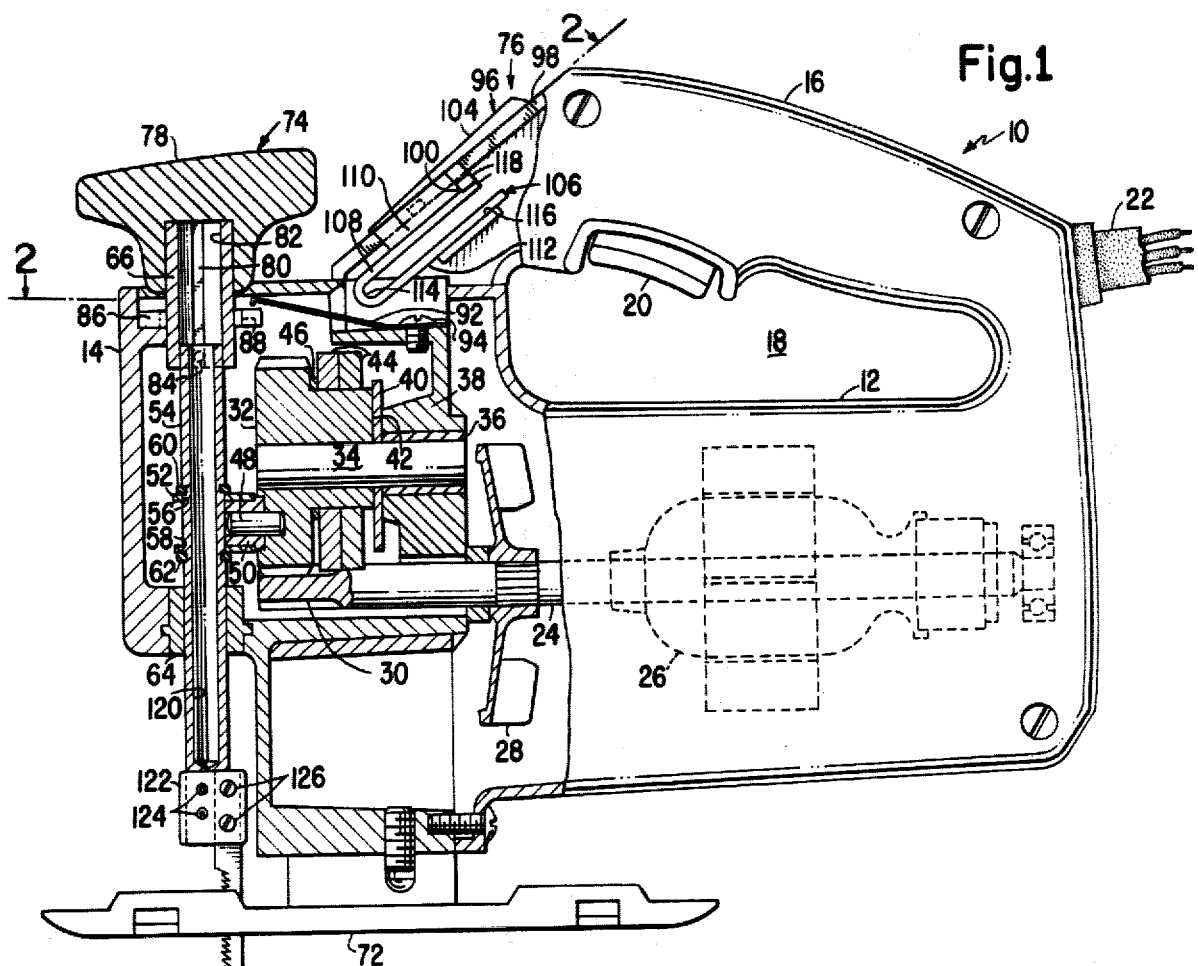
FIG. 1 is a side elevational view, partially in section, of a sabre saw in accordance with the present invention.
Figure 2:
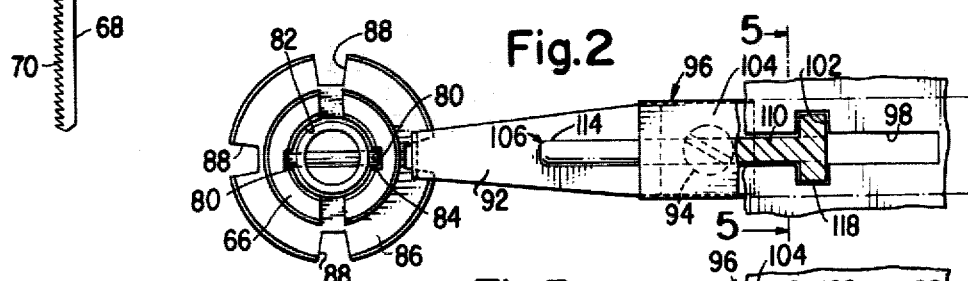
FIG. 2 is an enlarged cross-sectional illustration taken along line 2—2 of FIG. 1 of the saw bar swivel control means of the saw of FIG. 1 showing the mechanism in the swivel locking position.
Figure 3:
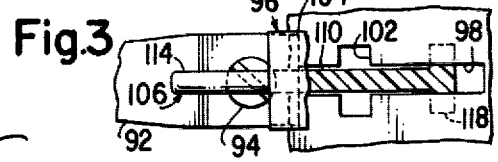
FIG. 3 is a view similar to FIG. 2 showing the mechanism in the unlocked position.
Figure 4:
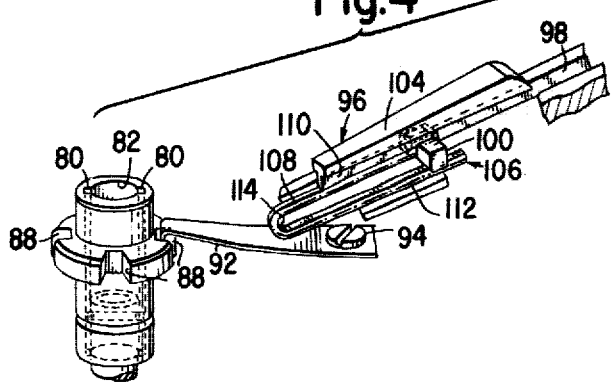
FIG. 4 is a perspective illustration of the saw bar swivel control mechanism of the preceeding figures illustrating the saw bar locked against rotation.
Figure 5:
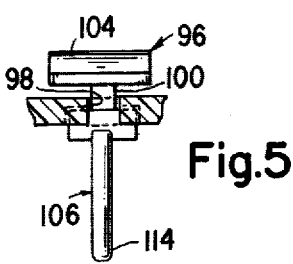
FIG. 5 is a cross-sectional partial view taken along line 5—5 of FIG. 2.

With reference now to the drawing, and particularly to FIG. 1 thereof, there is shown and illustrated therein a novel and improved sabre saw constructed in accordance with the principles of the present invention and designated generally by the reference character 10.

The sabre saw 10 comprises a motor housing portion 12, a front or drive housing portion 14 and a handle portion 16 of integral clam shell construction and defining a hand grip opening 18 generally beneath the handle portion 16 which, as shown, extends generally above the motor housing portion 12. Within the handle portion 16 and extending downwardly into the hand grip portion 18 is a trigger switch control 20 which, as will be appreciated by those having a skill in the art, may be of an ON/OFF switch or a variable speed control switch and which, when squeezed by an operator's forefinger is effective to operate the sabre saw 10. Also extending from the rear of the handle housing portion 16 is a power cord 22.

A shaft 24 of a driving electric motor indicated generally by the reference character 26 and mounted within the motor housing portion 12 carries a cooling fan 28 and extends into the front housing portion 14 and is formed with a splined end portion 30. The splined end portion 30 meshes with and drives a gear 32 fast on a stub shaft 34 journalled, as by means of a bearing 36 mounted within the front housing portion 14 as in a boss 38 and separated therefrom, as by a thrust washer 40. The gear 32 is integrally formed with an eccentric crank 42 which carries one or more, for example two, eccentrically mounted counter weights 44, separated from the gear teeth, as by a thrust washer 46 and slidably retained against rotation, as by guide pins (not shown) also mounted with the housing. The gear 32 also carries an eccentric pin 48 180° out of phase with the counter balance eccentric 42 and weights 44. The eccentric pin 48 is in turn surrounded by a roller 50 which engages a crosshead 52, perforated and formed as more particularly pointed out in my copending application Ser. No. 103,662 filed Dec. 14, 1979 and incorporated herein by reference. Together, the eccentric pin 48 and roller 50 with the crosshead 52 define a scotch yoke mechanism for reciprocating a generally cylindrical, generally tubular saw bar 54 which extends therethrough.

The saw bar 54 is free to turn about its axis within holes 56 and 58 of the crosshead 52, but is held axially captive by a pair of annular clinch rings or snap rings 60 and 62, respectively, disposed above and below the crosshead 52 and engaged within annular grooves provided above and below the crosshead 52 on the saw bar 54. The saw bar 54 is journalled for linear movement in a sleeve bearing 64 secured in the bottom portion of the front housing portion 14 and a journal bushing 66 secured in the top of the front housing portion 14 and rotatable therein.

Upon operation of the sabre saw, the motor shaft 24 will drive the gear 32 which, through pin 48 and roller 50 working in the crosshead 52, transmits linear axial reciprocatory motion to the saw bar 54 and drives an affixed saw blade 68 having a cutting edge 70 in a linear reciprocatory path substantially normal to the plane of a work-contacting shoe 72.

Means, in the form of a control knob assembly mounted for rotation with the saw bar 54, and designated generally by the reference character 74, and locking and unlocking means mounted with the housing and designated generally by the reference character 76 is provided for selectively and manually controlling the angular position of the saw bar 54 while it is reciprocating to provide the cutting stroke of the saw blade 68. The control knob assembly 74 includes the journal bushing 66 to which is affixed a control knob 78 by means of a set screw, or the like, not shown. The journal bushing 66 has internal diametrically positioned slots 80 communicating with a central aperture 82 in which the upper end portion of the saw bar 54 reciprocates. A pin 84 is secured to the upper end portion of the saw bar 54 in sliding engagement with the slots 80. The pin 84 is preferably secured to the saw bar 54 in such a position that its axis lies perpendicular the plane of the saw blade 68.

The locking and unlocking means 76 selectively locks the control assembly 74 and saw bar 54 against rotation and unlocks them for scroller action and comprises an annular collar 86 extending radially outwardly of the bushing 66 generally coaxial with the aperture bore 82 and provided with a plurality, such as four, axially and radially extending peripheral slots 88 disposed 90° apart, two in line with and two perpendicular to the pin 84 for selective engagement and disengagement with a latch comprising, for example, a leaf spring 92 cantilevered from the housing as by a screw 94 and controlled by means of a trigger slide 96 slidable in a slot 98 provided between the two clam shell halves of the housing 12.

The slot 98 is in general generally elongated and narrow with a cross slot 102 generally intermediate the ends thereof. The trigger slide 96 comprises a generally rectangular thumb slide portion 104 adapted to be disposed on the exterior of the housing 12 completely overlying the slots 98 and 102. Integrally formed with the thumb slide portion 104 is a generally wishbone or U-shaped spring 106 having a first leg 108 generally parallel the thumb slide 104, spaced apart therefrom by the thickness of the housing 12 and joined thereto, as by a generally perpendicular integral web 110 and a second leg 112 formed at a substantial angle thereto, for example, with the legs 108 and 112 in their unbiased state subtending an angle of 15°. When assembled with the housing 12, the free or distal leg 112 is bent around the bight 114 between the legs 100 and 112 so that the legs are generally parallel with the leg 112 contiguous a guide surface 116 provided in the housing 12 so as to bias the thumb portion 104 generally outwardly of the housing handle portion 16.

The leg 108, at its rearward end is provided with a cross pin 118 adapted, when the trigger slide 96 is in its foward position, to snap up into the cross slot 102, thereby locking the trigger slide 96 in its forward position whereat the bight portion 114 depresses the cantilever spring 92 so that the distal end thereof rides against the collar 86 if one of the notches 88 is not aligned therewith or into an aligned notch. Accordingly, the notches 88 need not be accurately are aligned with the cantilever spring 92 prior to forward movement of the trigger slide 96 and once the trigger slide is advanced, the control knob 78 may be rotated, as necessary, to align the desired one of the notches 88 with the nose of the cantilever spring 92, whereupon the spring will snap into the notch, locking the control assembly and saw bar 54 against rotation. To unlock the control assembly 74 and saw bar 54, it is merely necessary to depress the trigger slide 96, moving the cross bar 118 out of the cross slot 102 and internal of the housing handle portion 16, whereupon the trigger slide 96 may be slid upwardly and rearwardly, releasing the cantilever spring 96 from engagement with the one of said notches 88, allowing the saw bar 54 and control assembly 74 to be unlocked and freely rotated.

The saw bar 54 may be made hollow, as by a drilled bore 120 to adjacent the blade chuck 122 which, as described in more detail in my copending application Ser. No. 103,662, filed Dec. 14, 1979 and incorporated herein by reference as fully and completely as if reproduced hereat, may be made of aluminum and secured onto the saw bar 54, as by one or more pins 124. The blade 68 may be clamped in the chuck 122, as by means of one or more clamp screws 126.

While the invention has been described, disclosed, illustrated and shown in terms of a preferred embodiment or modification which it has assumed in practice, it is to be expressly understood that this has been done for purposes of example only and that the invention is not intended to be deemed limited thereby, and that other embodiments or modifications that may be suggested to those having the benefit of the teachings herein are intended to be reserved especially if they fall within the scope and spirit of the claims here appended.

I claim:

1. In a sabre saw having a generally tubular saw bar journalled for linear movement in a sleeve bearing secured in the bottom portion of the saw housing and a journal bushing secured in the top portion of the housing and rotatable therein and means provided between the top of the saw bar and the journal bushing so that they rotate together, a generally annular collar surrounding said journal bushing provided with a plurality of generally radial notches, a cantilevered leaf spring mounted to the housing with its distal end adjacent said collar and shaped for selective engagement within the notches, a slide trigger slidably carried by the housing at a top portion thereof convenient to an operator's thumb control which when slid towards the saw bar, depresses said cantilevered leaf spring against the collar and into a selective one of the notches when they are aligned for locking the saw bar against rotation.

2. Sabre saw defined in claim 1 further comprising spring biased latching means for selectively latching said trigger slide in its position wherein said cantilevered leaf spring is pressed by the slide toward said collar.

3. Sabre saw defined in claim 1 wherein the housing is of clam shell construction provided with a slot extending generally radially of said saw bar and guidingly supporting said trigger slide, the slot being generally elongated and narrow with a cross slot generally intermediate the ends thereof, said trigger slide comprising a generally rectangular thumb slide portion adapted to be disposed on the exterior of the housing overlying the slots and integrally formed with said thumb slide portion, a generally wishbone or U-shaped spring having a first leg generally parallel said rectangular thumb slide portion, spaced apart therefrom by the thickness of the housing and joined thereto by a generally perpendicular integral web and a second leg formed at a substantial angle thereto, together with a guide surface formed in the housing beneath the slot and parallel thereto so that when said trigger slide is assembled with the housing said second leg is bent around the bight between said legs so that said legs are generally parallel with said second leg contiguous said guide surface so as to bias the thumb portion generally outwardly of the housing handle portion, said first leg at its rearward end being provided with a cross pin adapted, when the trigger slide is in its forward position, to snap up into said cross slot thereby locking said trigger slide in its forward position.

* * * * *